US006977899B1

(12) United States Patent
Matragi et al.

(10) Patent No.: US 6,977,899 B1
(45) Date of Patent: Dec. 20, 2005

(54) METHOD AND APPARATUS FOR MESSAGE-BASED OVERLOAD CONTROL IN A DISTRIBUTED CALL-PROCESSOR COMMUNICATION SYSTEM

(75) Inventors: Wassim A. Matragi, Brooklyn, NY (US); Behrokh Samadi, Basking Ridge, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/488,181

(22) Filed: Jan. 20, 2000

(51) Int. Cl.[7] ............................ H04J 1/16; H04J 3/14; G06F 15/16; G06F 15/173

(52) U.S. Cl. .................. 370/237; 370/230.1; 370/235; 370/236; 709/202; 709/235

(58) Field of Search ................................ 370/217, 522, 370/524, 410, 229–231, 235–238; 342/357.06, 342/217; 709/202, 235

(56) References Cited

U.S. PATENT DOCUMENTS 1,859 A * 11/1840 Asthana et al. ............... 84/361
4,345,116 A * 8/1982 Ash et al. .............. 379/221.01
6,052,373 A * 4/2000 Lau ............................ 370/399
6,104,338 A * 8/2000 Krasner ................. 342/357.06
6,215,765 B1 * 4/2001 McAllister et al. ......... 370/217
6,396,808 B1 * 5/2002 Kunimoto et al. .......... 370/236

* cited by examiner

*Primary Examiner*—Chi Pham
*Assistant Examiner*—Ronald Abelson

(57) ABSTRACT

A method and apparatus are disclosed for alleviating congestion and overload in a distributed call-processing system interconnected through a packet based network. The illustrative Internet Protocol network includes a plurality of end terminals and distributed call processors. According to an aspect of the invention, the call processor will determine whether to process a call request or to forward the request to another call processor. Generally, the call processor will declare an overload condition if sufficient resources (including processing or memory resources) are not available to process a given call. If a call processor determines that it is too congested to process a call, the call processor enters an overload condition, selects an alternate call processor and forwards the request to the alternate call processor. Each call processor maintains an ordered list of call processors that indicates whether or not each call processor is overloaded.

24 Claims, 6 Drawing Sheets

OVERLOAD CONTROL ANALYSIS TABLE -- 300

| | | CALL PROCESSOR (340) | CONGESTION INDICATOR (345) | LAST MESSAGE SENT (350) | TIMER (355) |
|---|---|---|---|---|---|
| 305 | | | | | |
| 310 | | | | | |
| 315 | | | | | |
| 320 | | | | | |

FIG. 6A

| | | | |
|---|---|---|---|
| CP2 | 0 | 1 | – |
| CP3 | 1 | 0 | 2 MINUTES |
| CP4 | 0 | 0 | – |
| CP5 | 0 | 0 | – |

TCI=0

FIG. 6B

| | | | |
|---|---|---|---|
| CP2 | 0 | 0 | – |
| CP3 | 1 | 0 | 2 MINUTES |
| CP4 | 0 | 1 | – |
| CP5 | 0 | 0 | – |

TCI=0

FIG. 7A

| | | | |
|---|---|---|---|
| CP5 | 0 | 0 | – |
| CP1 | 0 | 0 | – |
| CP2 | 1 | 0 | 1 MINUTE |
| CP3 | 1 | 0 | 2 MINUTES |

FIG. 7B

| | | | |
|---|---|---|---|
| CP5 | 0 | 0 | – |
| CP1 | 1 | 0 | 3 MINUTES |
| CP2 | 1 | 0 | 1 MINUTE |
| CP3 | 1 | 0 | 2 MINUTES |

FIG. 8A

| | | | |
|---|---|---|---|
| CP2 | 0 | 1 | – |
| CP3 | 1 | 0 | 2 MINUTES |
| CP4 | 1 | 0 | 2.5 MINUTES |
| CP5 | 1 | 0 | 1 MINUTE |

TCI=0

FIG. 8B

| | | | |
|---|---|---|---|
| CP2 | 0 | 1 | – |
| CP3 | 1 | 0 | 2 MINUTES |
| CP4 | 1 | 0 | 2.5 MINUTES |
| CP5 | 1 | 0 | 1 MINUTE |

TCI=0

METHOD AND APPARATUS FOR MESSAGE-BASED OVERLOAD CONTROL IN A DISTRIBUTED CALL-PROCESSOR COMMUNICATION SYSTEM

FIELD OF THE INVENTION

The present invention relates to packet communication systems, and more particularly, to method and apparatus for congestion management in a distributed call-processor communication system.

BACKGROUND OF THE INVENTION

Communication networks are used to transfer information, such as data, voice, text or video information, among communication devices, such as packet telephones, computer terminals, multimedia workstations, and videophones, connected to the networks. A network typically comprises nodes connected to each other, and to communication devices, by various links. Transmitted information may be of any form, but is often formatted into packets or cells.

Packet-switching network architectures, such as networks using Internet Protocol (IP) or asynchronous transfer mode (ATM) protocols, are widely used. In a packet-switched network, data transmissions are typically divided into blocks of data, called packets, for transmission through the network. For a packet to get to its proper destination, the packet must traverse through one or more network switches, routers or intermediate systems. Typically, a packet includes a header, containing source and destination address information, as well as a payload (the actual application data).

When a call is initiated in an Internet Protocol network environment, a call processor performs the required tasks to setup the call and allocate the necessary resources. In such an environment, a congestion management policy is required to ensure that sufficient network resources are available in the network to handle the signaling and control of the call. If the call processor is in an "overload" condition, where the volume of signaling traffic exceeds the capacity of the call processor, the call processor should exercise overload control. If overload is not properly controlled, system throughput can be reduced, and even cause the network to cease operation. In order to effectively control the load, many systems drop the incoming call requests in order to preserve the quality of service for the ongoing calls. However, in a distributed environment, a better policy is to identify an alternate processor that can handle the new call. If such an alternate processor cannot be found, then the new call is dropped.

Currently, many communication systems rely on a distributed call-processing architecture for reliability and scalability reasons. Internet Protocol-based private branch exchange (IP-PBX) switches, for example, distribute the call processing functionality among many servers. Thus, while the initial call processor that receives the call admission request may be in an overload condition, another call processor in the distributed network environment may be available to process the call.

A number of congestion management techniques have been proposed or suggested that determine the availability of an alternate call processor. These congestion management techniques generally rely on periodic polling of the other call processors in the distributed network Typically, each call processor communicates with every other call processor in the distributed network environment to collect statistics for each call processor. The collected statistics help determine the availability of each call processor to perform a specific task in the event of an overload condition. Thus, such polling-based congestion management techniques increase network overhead and potentially contribute to the overload conditions they are attempting to mitigate.

As apparent from the above-described deficiencies with conventional systems for overload control, a need exists for an improved method and apparatus for overload control in a distributed network environment that admits as many calls as possible. A further need exists for an overload control method and apparatus that alleviate congestion and control overload in a distributed call-processing system with minimal overhead and a low processing requirement load by the call processors.

SUMMARY OF THE INVENTION

Generally, a method and apparatus are disclosed for alleviating congestion and overload in an Internet Protocol network having a distributed call-processing system. The illustrative Internet Protocol network includes a plurality of end terminals (ETs) and distributed call processors (CPs). When an end terminal wants to place a call, the end terminal sends a call set up message to a call processor. According to an aspect of the invention, the call processor will determine whether to process the request or to forward the request to another call processor. Generally, the call processor will declare an overload condition if sufficient resources are not available to process a given call.

According to an aspect of the invention, if a call processor determines that it is too congested to process a call, the call processor enters an overload condition, selects an alternate call processor and forwards the request to the alternate call processor. A given call processor implicitly announces its overload condition to another call processor by virtue of the forwarded call setup request message. According to another feature of the invention, each call processor maintains an ordered list of call processors that indicates whether or not each call processor is overloaded in addition to providing a preferred list of call processors to handle the overflow traffic. In this manner, an alternate call processor can be selected using the ordered list of call processors. The present invention will result in distributing the forwarded call setup request messages, carrying the congestion indication among all of the available alternate call processors. In one implementation, a last message sent (LMS) flag is utilized that indicates the last call processor to receive a forwarded congestion message. Generally, a call processor in an overload condition will not forward another congestion message to a call processor having its last message sent flag set unless there are no other call processors available.

According to another aspect of the invention, the congested call processor attaches a call processor identifier to the forwarded congestion message, indicating to the recipient call processor that the congested call processor is in an overload condition. Thus, a forwarded congestion message will cause the recipient call processor to set a flag, for example, in the ordered list of call processors, indicating that the congested call processor is congested. In one embodiment, each congestion flag has an associated timer that causes the flag to expire (or reset) after a predefined time interval that permits the congested call processor to recover from the overload condition.

A more complete understanding of the present invention, as well as further features and advantages of the present invention, will be obtained by reference to the following detailed description and drawings.

BRIEF DESCRIPTION OF THE DRAWINGS

FIGS. 6A and 6B illustrate the overload control analysis table of FIG. 3 populated with data for call processor (CP1) of FIG. 1 before and after, respectively, detecting an overload condition and forwarding a call set up message to an alternate call processor;

FIGS. 7A and 7B illustrate the overload control analysis table of FIG. 3 populated with data for call processor (CP4) before and after, respectively, receiving a forwarded call set up message from call processor (CP1); and FIGS. 8A and 8B illustrate the overload control analysis table of FIG. 3 populated with data for call processor (CP1) of FIG. 1 to illustrate the use of the last message sent flag bit in accordance with one feature of the present invention.

DETAILED DESCRIPTION

Figure 1:
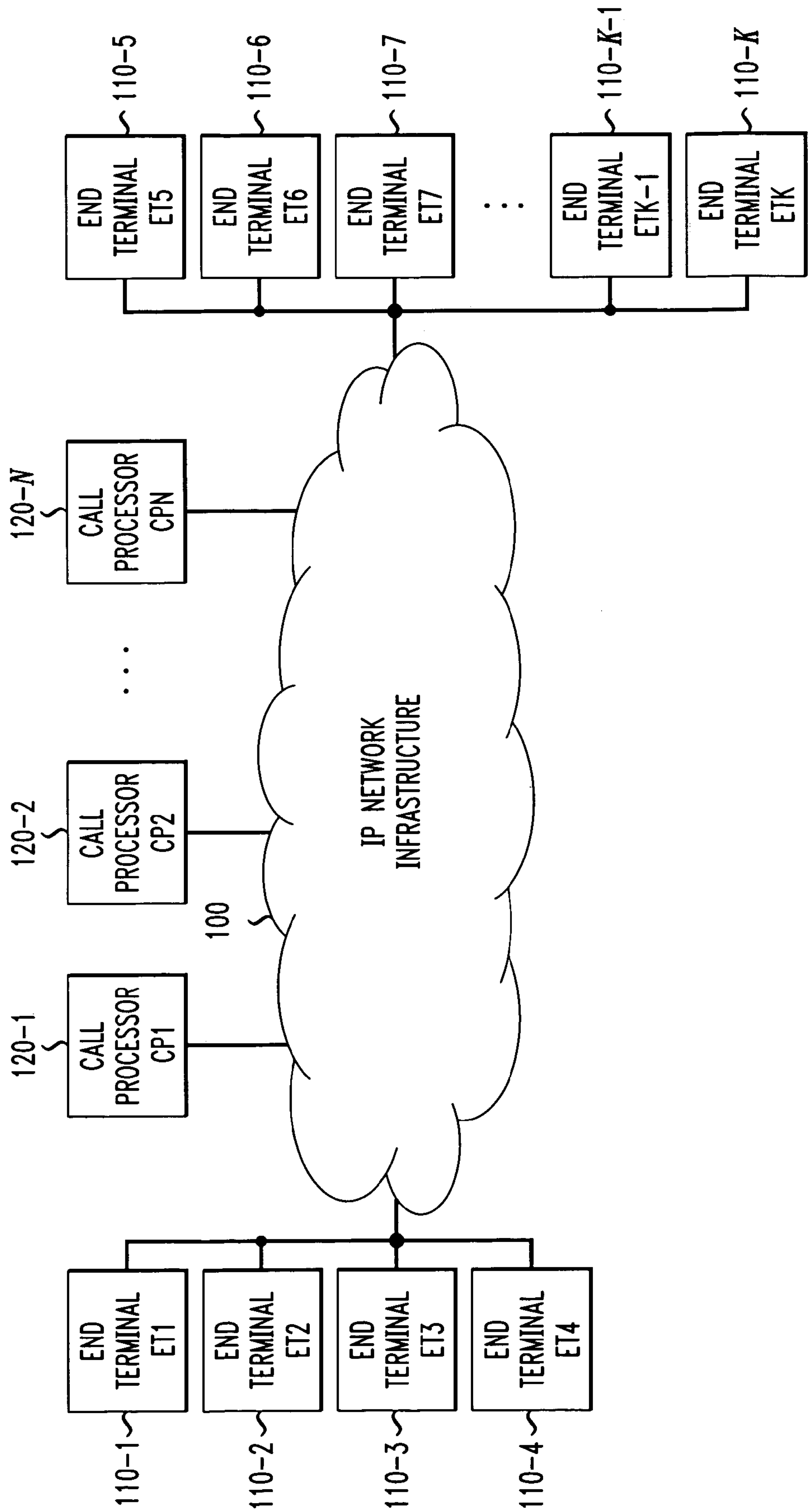
FIG. 1 illustrates a network environment in which the present invention can operate.

FIG. 1 illustrates a network environment in which the present invention can operate. As shown in FIG. 1, the network 100 interconnects a plurality of end terminals 110-1 through 110-K (hereinafter, collectively referred to as end terminals 110) and call processors 120-1 through 120-N (hereinafter, collectively referred to as call processors (CPa) 120). The network 100 may be embodied as any IP or data network infrastructure and generally provides complete connectivity between all of the end terminals 110-1 through 110-N and call processors 120-1 through 120-N.

The end terminals 110 may be embodied as any communication device in a packet network, including Internet Protocol telephones, workstations, packet telephone adapter and a facsimile machine. The call processors 120 may be embodied using the call processor feature of the IP Exchangecom™ product, commercially available from Lucent Technologies, Inc., of Murray Hill, N.J., as modified herein to provide the features and functions of the present invention.

Typically, in an Internet Protocol network environment, each end terminal 110 is associated initially with a specific primary call processor 120. For example, as shown in FIG. 1, end terminal (ET1) 110-1 is associated with call processor (CP1) 120-1, whereas end terminal (ET5) 110-5 is associated with call processor (CP5) 120-5. Thus, whenever end terminal (ET1) 110-1 wants to place a call, a Call Set Up message is sent from end terminal (ET1) 110-1 to call processor (CP1) 120-1 for processing, in a known manner. According to the present invention, call processor (CP1) 120-1 will decide whether to process the request or to forward the request to another call processor 120 based on considerations discussed below. Generally, each call processor 120 measures the resources under its control, such as processor utilization and memory usage. Based on these resource measurements, the call processor 120 can declare congestion if sufficient resources are not available to process the call.

According to the present invention, if the call processor 120 determines that it is too congested to process the call, the call processor 120 enters an overload condition, selects an alternate call processor 120 and forwards the request to the alternate call processor 120. A given call processor 120 implicitly announces its overload condition to another call processor 120 by virtue of the forwarded congestion message. According to one feature of the present invention, each call processor 120 maintains an ordered list of call processors 120 that indicates whether or not each call processor 120 is overloaded. In this manner, an alternate call processor 120 can be selected using the ordered list of call processors 120.

In addition, the present invention will result in distributing the forwarded congestion messages among all of the available alternate call processors 120 if one of the processors on the ordered list are also congested. Thus, in one implementation, the present invention utilizes a last message sent flag indicating the last call processor 120 to receive a forwarded congestion message. Generally, a call processor 120 in an overload condition will not forward another congestion message to a call processor 120 having its last message sent flag set unless there are no other call processors 120 available.

According to another feature of the present invention, the congested call processor 120 attaches a call processor identifier to the forwarded congestion message, indicating to the recipient call processor that the congested call processor 120 is in an overload condition. Thus, a forwarded congestion message will cause the recipient call processor 120 to set a flag, for example, in the ordered list of call processors 120, indicating that the congested call processor 120 is congested. In one embodiment, each congestion flag has an associated timer that causes the flag to expire (or reset) after a predefined time interval that permits the congested to recover from the overload condition.

Figures 2, 3:
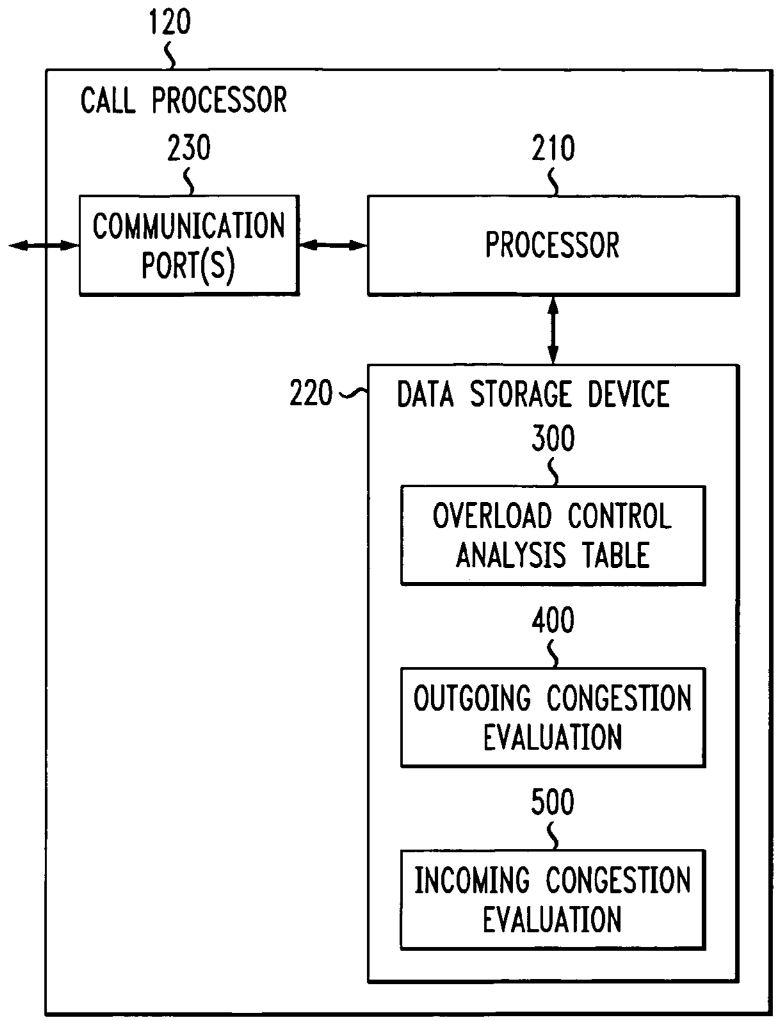
FIG. 2 is a schematic block diagram of a call processor of FIG. 1 in accordance with the present invention.
FIG. 3 is a sample table from the overload control analysis table of FIG. 2.

FIG. 2 is a schematic block diagram of an illustrative call processor 120. As shown in FIG. 2, the call processor 120 includes certain hardware components, such as a processor 210, a data storage device 220, and one or more communications ports 230. The processor 210 can be linked to each of the other listed elements, either by means of a shared data bus, or dedicated connections, as shown in FIG. 2. The communications port(s) 230 allow(s) the call processor 120 to communicate with all of the other network nodes 110, 120 over the network 100.

The data storage device 220 is operable to store one or more instructions, discussed further below in conjunction with FIGS. 4 and 5, which the processor 210 is operable to retrieve, interpret and execute in accordance with the present invention. In addition, as discussed further below in conjunction with FIG. 3, the data storage device 220 includes an overload control analysis table 300. Generally, the overload control analysis table 300 maintains the ordered list of call processors 120 and is utilized to select an alternate call processor 120 in the event of an overload condition.

In addition, the data storage device 220 includes an outgoing congestion evaluation process 400 and an incoming congestion evaluation process 500, discussed further below in conjunction with FIGS. 4 and 5, respectively. Generally, the outgoing congestion evaluation process 400 determines whether the call processor 120 is too congested to process a given call, and if so, enters an overload condition and forwards the request to a selected alternate call processor 120. The incoming congestion evaluation process 500 processes a forwarded congestion message that has been received from a congested call processor 120. The incoming congestion evaluation process will set a flag indicating that the congested call processor 120 is congested.

FIG. 3 illustrates an overload control analysis table 300 that is maintained by each call processor 120. Generally, the overload control analysis table 300 maintains the ordered list of call processors 120 and is utilized to select an alternate call processor 120 in the event of an overload condition. In one embodiment, the overload control analysis table 300 maintains a plurality of records, 305 through 320, each associated with a different alternate call processor 120. For each call processor 120 identified in field 340, the overload control analysis table 300 maintains a congestion indicator (CI) in field 345 indicating whether or not the call processor 120 is congested. If the congestion indicator is equal to one, then the call processor 120 is congested. If the congestion indicator is equal to zero, then the call processor 120 is not congested. In addition, the overload control analysis table 300 utilizes the last message sent bit in field 350 to indicate the last call processor 120 to receive a forwarded congestion message, as previously described. Finally, field 355 maintains a timer indicating the amount of time since a forwarded congestion message was received from the corresponding call processor 120.

In one implementation, the overload control analysis table 300 also maintains a total congestion indicator (TCI) bit. The total congestion indicator bit is the outcome of the AND operation of all of the entries in the congestion indicator field 445. The total congestion indicator bit indicates whether there is total congestion. If the total congestion indicator bit is set to one, then all of the alternate call processors 120 are congested, so the current call processor 120 does not go through the overload control analysis table 300 unnecessarily.

Figure 4:
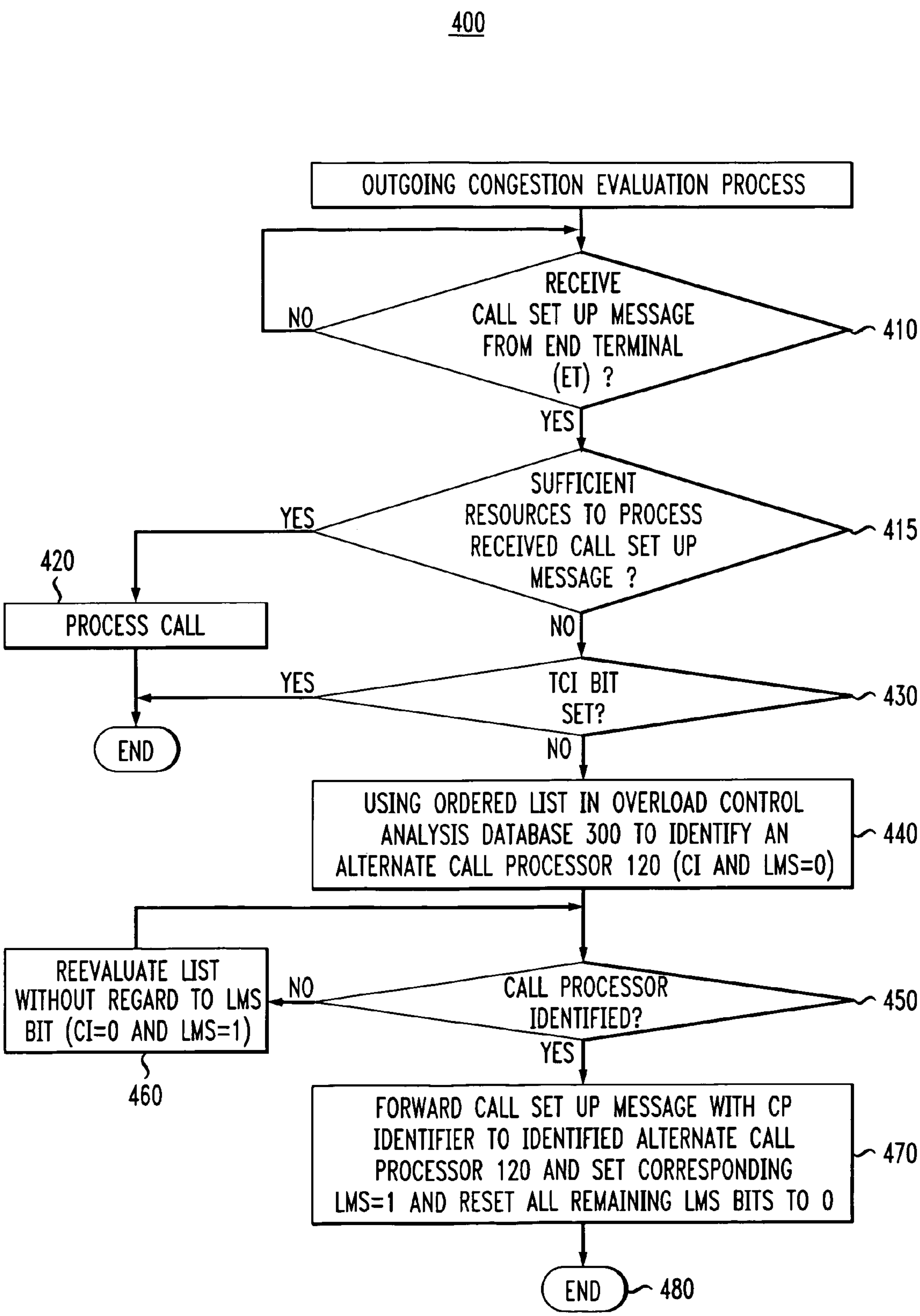
FIG. 4 is a flow chart describing an exemplary outgoing congestion evaluation process incorporating features of the present invention and employed by the call processor of FIG. 2.

FIG. 4 is a flow chart describing an exemplary outgoing congestion evaluation process incorporating features of the present invention and employed by the call processor of FIG. 2. As previously indicated, the outgoing congestion evaluation process 400 determines whether the call processor 120 is too congested to process a given call, and if so, enters an overload condition and forwards the request to a selected alternate call processor 120.

As shown in FIG. 4, the outgoing congestion evaluation process initially performs a test during step 410 to determine if a call set up message has been received from an end terminal 110. The test is performed continuously or periodically during step 410 until a call set up message is received. Once a call set up message is received, the outgoing congestion evaluation process 400 performs a further test during step 415 to determine if the call processor 120 has sufficient resources to process the call set up message. If it is determined during step 415 that the call processor 120 has sufficient resources to process the call, then the call is processed during step 420 in a conventional manner, before program control terminates during step 425.

If, however, it is determined during step 415 that the call processor 120 does not have sufficient resources to process the call, then a test is performed during step 430 to determine if the total congestion indicator flag is set. If it is determined during step 430 that the total congestion indicator flag is set, then there are no alternate call processors 120 available and program control terminates during step 425.

If, however, it is determined during step 430 that the total congestion indicator flag is not set, then the outgoing congestion evaluation process 400 proceeds to identify an alternate call processor 120 in accordance with the present invention. Thus, the overload control analysis table 300 is utilized during step 440 to identify the next call processor 120 in the ordered list that is not overloaded and did not receive the last forwarded congestion message from the current call processor 120 (CI and LMS=0).

A test is then performed during step 450 to determine if an alternate call processor 120 was identified during the previous step. If it is determined during step 450 that an alternate call processor 120 was not identified during the previous step, then the ordered list is reevaluated during step 460 without regard to the last message sent flag. Program control then proceeds to step 450 and continues in the manner described above.

If, however, it is determined during step 450 that an alternate call processor 120 was identified during the previous step, then a call set up message is forwarded to the identified alternate call processor 120 during step 470, and the last message sent flag in the overload control analysis table 300 is set to one for the selected alternate call processor 120. In addition, all of the remaining last message sent bits are set to 0 during step 470. Program control then terminates during step 480.

Figure 5:
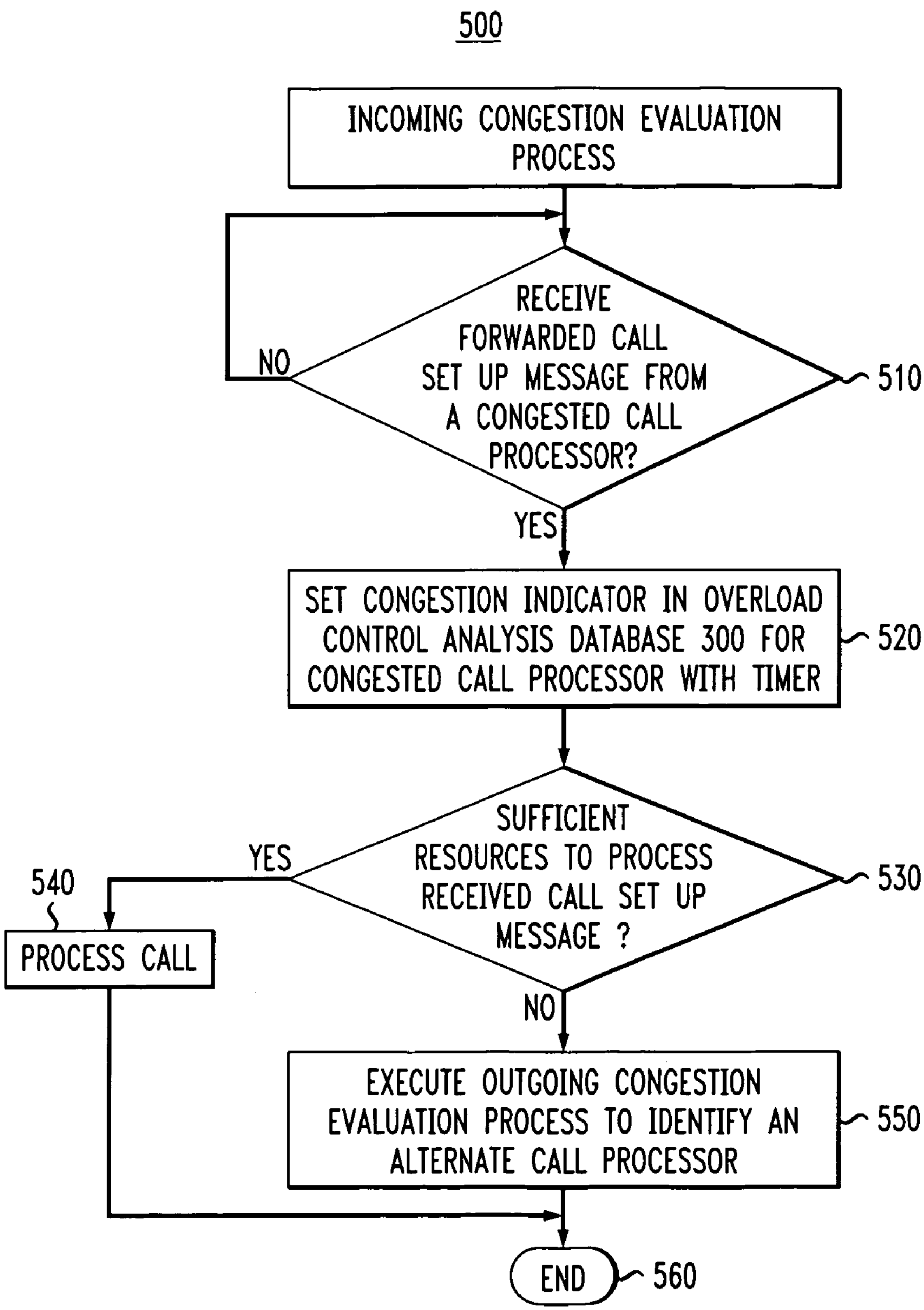
FIG. 5 is a flow chart describing an exemplary incoming congestion evaluation process incorporating features of the present invention and employed by the call processor of FIG. 2.

FIG. 5 is a flow chart describing an exemplary incoming congestion evaluation process incorporating features of the present invention and employed by the call processor of FIG. 2. The incoming congestion evaluation process 500 processes a forwarded congestion message that has been received from a congested call processor 120. The incoming congestion evaluation process will set a flag indicating that the congested call processor 120 is congested.

As shown in FIG. 5, the incoming congestion evaluation process 500 initially performs a test during step 510 to determine if a forwarded call set up message has been received from a congested call processor 120. The test is performed continuously or periodically during step 510 until a forwarded call set up message has been received. Once a forwarded call set up message has been received, the incoming congestion evaluation process 500 will set a congestion indicator flag during step 520 in the overload control analysis table 300 for the congested call processor 120 (from which it has received the message). In addition, the timer is also set in the corresponding entry of the overload control analysis table 300. The timer will automatically cause the congestion indicator flag to expire for the congested call processor 120 after a period of time within which the congestion status should have been alleviated.

Thereafter, the incoming congestion evaluation process performs a test during step 530 to determine if the receiving call processor 120 itself has sufficient resources to process the received call set up message. If it is determined during step 530 that the receiving call processor 120 itself has sufficient resources to process the received call set up message, then the call is processed in a conventional manner during step 540 before program control terminates during step 560.

If, however, it is determined during step 530 that the receiving call processor 120 does not have sufficient resources to process the received call set up message, then the incoming congestion evaluation process executes the outgoing congestion evaluation process 400 during step 550 to identify a further alternate call processor 120, before program control terminates during step 560.

EXAMPLES

FIGS. 6A and 6B illustrate an overload control analysis table 300 populated with data for call processor (CP1) 120-1 at a given instant of time, before and after, respectively, detecting an overload condition and forwarding a call set up message to an alternate call processor. If call processor (CP1) 120-1 is congested and receives a Call Set Up message from any of the associated end terminals 110-1 through 110-3, call processor (CP1) 120-1 will forward the message to the next available call processor 120. Call processor (CP1) 120-1 initially checks the total congestion indicator bit in the overload control analysis table 300. If the total congestion indicator bit equals zero, then at least one of the alternate call processors 120 is not congested. Call processor (CP1) 120-1 then evaluates its overload control analysis table 300, and goes through the ordered list of the call processors 120. If the next call processor in the list, such as call processor (CP2) 120-2, is not congested, but has its last message sent bit set to 1, then the last call set up message that was forwarded by call processor (CP1) 120-1 was forwarded to call processor (CP2) 120-2. Thus, in order to balance the overflow load over all the non-congested call processors, call processor (CP1) 120-1 attempts to forward the message to another call processor 120. Call processor (CP1) 120-1 skips call processor (CP2) 120-2 and checks the status of the next call processor, such as call processor (CP3) 120-3. Since the congestion bit of call processor (CP3) 120-3 is set, then call processor (CP3) 120-3 gets skipped as well. The congestion indicator and last message sent flag are set to 0 for the next call processor CP4, so call processor CP4 is a valid candidate. Thus, call processor (CP1) 120-1 forwards the call set up message to call processor (CP4) 120-4. Call processor CP1 sets the last message sent bit to 1 in the CP4 row and sets the last message sent bit to 0 in the CP2 row to indicate that the last forwarded message has been sent to call processor CP4. FIGS. 7A and 7B illustrate an overload control analysis table 300 populated with data for call processor (CP4) 120-4 at a given instant of time, before and after, respectively, receiving a forwarded call set up message from call processor (CP1) 120-1.

FIGS. 8A and 8B illustrate the use of the last message sent flag bit. Assuming call processor (CP1) 120-1 is congested and it receives a call set up message from an end terminal 110, call processor (CP1) 120-1 will initially check the total congestion indicator bit. Assuming the total congestion indicator bit is zero, there is at least one non-congested call processor. Call processor (CP1) 120-1 will identify a non-congested call processor and forward the call setup message. As shown in FIG. 8A, call processor (CP2) 120-2 is not congested, but call processor (CP1) 120-1 has already sent the last forwarded message to call processor (CP2) 120-2 (LMS=1). Call processor (CP1) 120-1 skips call processor (CP2) 120-2 and continues evaluating other call processors identified in the overload control analysis table 300. The remaining call processors are all congested (CI=1). Thus, call processor (CP1) 120-1 revisits the overload control analysis table 300 again, and forwards the message to the first non-congested call processor, irrespective of the last message sent flag bit status.

It is to be understood that the embodiments and variations shown and described herein are merely illustrative of the principles of this invention and that various modifications may be implemented by those skilled in the art without departing from the scope and spirit of the invention.

We claim:

1. An overload control method for use in a network employing distributed call-processing, said method comprising the steps of:

receiving a call set up request from an end terminal;

determining if sufficient resources exist in a call processor to process said call set up request;

identifying an alternate call processor to process said call set up request using a list of call processors if sufficient resources do not exist, wherein said list of call processors includes a congestion status of one or more of said call processors; and forwarding said call set up request to said identified alternate call processor with an identifier of said congested call processor, whereby said forwarded call set up request indicates to said alternate call processor that said congested call processor is congested.

2. The method of claim 1, wherein a call processor that previously received a forwarded call set up request within a predefined interval is not selected as the alternate call processor during said identifying step.

3. The method of claim 1, wherein said identifying step further comprises the step of evaluating a congestion indicator flag associated with each potential alternate call processor, wherein said congestion indicator flag is set if a congestion message is received from said corresponding alternate call processor.

4. The method of claim 1, wherein said forwarding step further comprises the step of setting a flag indicating that said selected alternate call processor received said forwarded call set up request.

5. The method of claim 4, wherein said flag indicating that said selected alternate call processor received said forwarded call set up request automatically expires after a predefined interval.

6. The method of claim 1, wherein said identifying step further comprises the step of evaluating a total congestion indicator flag indicating whether all potential alternate call processors are congested.

7. The method of claim 1, wherein said list of call processors is an ordered list.

8. An overload control method for use in a network employing distributed call-processing, said method comprising the steps of:

receiving a forwarded call set up request from a congested call processor, said forwarded call set up request including an identifier of said congested call processor; and setting a flag associated with said congested call processor indicating that said congested call processor is congested by utilizing said received call set up request.

9. The method of claim 8, further comprising the step of determining if sufficient resources exist to process said forwarded call set up request.

10. The method of claim 8, further comprising the step of setting a timer associated with said flag.

11. The method of claim 10, further comprising the step of automatically expiring said flag in accordance with said timer.

12. The method of claim 8, further comprising the steps of receiving a call set up request from an end terminal, determining if sufficient resources exist to process said call set up request and identifying an alternate call processor to process said call set up request using said flag associated with each potential alternate call processor.

13. An overload control manager for use in a network employing distributed call-processing, comprising:

a memory for storing computer readable code; and a processor operatively coupled to said memory, said processor configured to:

receive a call set up request from an end terminal;

determine if sufficient resources exist in a call processor to process said call set up request;

identify an alternate call processor to process said call set up request using a list of call processors if sufficient resources do not exist, wherein said list of call processors includes a congestion status of one or more of said call processors; and forward said call set up request to said identified alternate call processor with an identifier of said congested call processor, whereby said forwarded call set up request indicates to said alternate call processor that said congested call processor is congested.

14. The overload control manager of claim 13, wherein a call processor that previously received a forwarded call set up request within a predefined interval is not selected as the alternate call processor during said identifying step.

15. The overload control manager of claim 13, wherein said processor is further configured to evaluate a congestion indicator flag associated with each potential alternate call processor, wherein said congestion indicator flag is set if a congestion message is received from said corresponding alternate call processor.

16. The overload control manager of claim 13, wherein said processor is further configured to set a flag indicating that said selected alternate call processor received said forwarded call set up request.

17. The overload control manager of claim 16, wherein said flag indicating that said selected alternate call processor received said forwarded call set up request automatically expires after a predefined interval.

18. The overload control manager of claim 13, wherein said processor is further configured to evaluate a total congestion indicator flag indicating whether all potential alternate call processors are congested.

19. The overload control manager of claim 13, wherein said list of call processors is an ordered list.

20. An overload control manager for use in a network employing distributed call-processing, comprising:

a memory for storing computer readable code; and a processor operatively coupled to said memory, said processor configured to:

receiving a forwarded call set up request from a congested call processor, said forwarded call set up request including an identifier of said congested call processor; and setting a flag associated with said congested call processor indicating that said congested call processor is congested by utilizing said received call set up request.

21. The overload control manager of claim 20, wherein said processor is further configured to determine if sufficient resources exist to process said forwarded call set up request.

22. The overload control manager of claim 20, wherein said processor is further configured to set a timer associated with said flag.

23. The overload control manager of claim 20, wherein said processor is further configured to automatically expire said flag in accordance with said timer.

24. The overload control manager of claim 20, wherein said processor is further configured to (i) receive a call set up request from an end terminal, (ii) determine if sufficient resources exist to process said call set up request and (iii) identify an alternate call processor to process said call set up request using said flag associated with each potential alternate call processor.

* * * * *